(12) United States Patent
Bower

(10) Patent No.: US 11,138,813 B2
(45) Date of Patent: Oct. 5, 2021

(54) APPARATUS, SYSTEMS, AND METHODS FOR ESTIMATING AND REPORTING ELECTRIC VEHICLE RANGE WHILE TOWING

(71) Applicant: Toyota Motor Engineering & Manufacturing North America, Inc., Plano, TX (US)

(72) Inventor: Laura E. Bower, Whitmore Lake, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 254 days.

(21) Appl. No.: 16/249,259

(22) Filed: Jan. 16, 2019

(65) Prior Publication Data

US 2020/0226850 A1 Jul. 16, 2020

(51) Int. Cl.
*G07C 5/00* (2006.01)
*B60L 58/12* (2019.01)
*G07C 5/08* (2006.01)
*B60Q 9/00* (2006.01)
*G01C 21/34* (2006.01)
*B60K 6/20* (2007.10)

(52) U.S. Cl.
CPC .............. *G07C 5/004* (2013.01); *B60L 58/12* (2019.02); *B60Q 9/00* (2013.01); *G01C 21/3469* (2013.01); *G07C 5/0825* (2013.01); *B60K 6/20* (2013.01); *B60Y 2200/91* (2013.01); *B60Y 2200/92* (2013.01)

(58) Field of Classification Search
CPC ....... G07C 5/004; G07C 5/0825; B60L 58/12; B60Q 9/00; G01C 21/3469; B60K 6/20; B60Y 2200/91; B60Y 2200/92
See application file for complete search history.

(56) References Cited

U.S. PATENT DOCUMENTS

| 5,487,002 | A | * | 1/1996 | Diller | G01C 21/26 701/1 |
| 9,067,595 | B2 | | 6/2015 | Wright et al. | |
| 9,630,504 | B2 | | 4/2017 | Tseng et al. | |
| 9,738,125 | B1 | * | 8/2017 | Brickley | B60D 1/26 |
| 9,834,111 | B2 | | 12/2017 | Grewal et al. | |
| 10,047,855 | B2 | | 8/2018 | Lee | |
| 2013/0166123 | A1 | | 6/2013 | Donald et al. | |
| 2013/0253814 | A1 | * | 9/2013 | Wirthlin | G01L 11/025 701/124 |
| 2014/0129139 | A1 | | 5/2014 | Ellison et al. | |

(Continued)

*Primary Examiner* — Rami Khatib
*Assistant Examiner* — Shahira Baajour
(74) *Attorney, Agent, or Firm* — Haynes and Boone, LLP

(57) ABSTRACT

A driving range estimator system for a vehicle accounting for a load on the vehicle may include an energy storage device configured to power the vehicle. Sensors may be disposed about the vehicle and may be configured to detect information relevant to a range estimate. A towing control unit may be configured to receive the detected information from the sensors, and configured to determine a) an expected range for the vehicle with the load, and b) an expected range for the vehicle without the load. A display may be configured to simultaneously display a) the expected range for the vehicle with the load and b) the expected range for the vehicle without the load.

20 Claims, 8 Drawing Sheets

(56) References Cited

U.S. PATENT DOCUMENTS

| | | | |
|---|---|---|---|
| 2015/0057916 A1* | 2/2015 | Ishii | G01C 21/3469 |
| | | | 701/123 |
| 2016/0209227 A1 | 7/2016 | Nagy et al. | |
| 2017/0140349 A1* | 5/2017 | Ricci | B60L 53/665 |
| 2017/0368955 A1 | 12/2017 | Zenner et al. | |
| 2018/0001788 A1 | 1/2018 | Geub et al. | |
| 2018/0073883 A1 | 3/2018 | Ishibashi | |

* cited by examiner

APPARATUS, SYSTEMS, AND METHODS FOR ESTIMATING AND REPORTING ELECTRIC VEHICLE RANGE WHILE TOWING

TECHNICAL FIELD

The subject matter described herein relates generally to tracking battery usage in electric vehicles and, more particularly, to apparatus, systems, and methods for estimating the remaining range of an electric vehicle with a substantial towed or carried load. This method has particular but not exclusive utility for consumer and commercial electric and plug-in hybrid vehicles.

BACKGROUND

Vehicle range estimation commonly used in electric vehicles (EVs). However, towed or carried loads reduce the range of a vehicle. Accordingly, current range estimation methods may not be accurate for vehicles with substantial towed or carried loads (e.g., loads greater than a threshold mass, weight, or rolling resistance), and may not provide information to drivers that is sufficient for planning purposes. It is to be appreciated that such commonly used range estimation methods have numerous drawbacks, including but not limited to fixed assumptions about the configuration of the vehicle.

The range of electric vehicles may be more affected by towing than that of internal combustion vehicles. Furthermore, electric vehicle charging stations may be less common and less well distributed than internal combustion fueling stations, and charging an electric vehicle may take substantially longer than refueling an internal combustion vehicle. Furthermore, the inconvenience of rescuing a depleted electric vehicle vs. a comparable internal combustion vehicle may be substantially greater (e.g., one can't simply bring back a small can of gasoline to carry the vehicle to the nearest station). For these and other reasons, the costs and difficulties associated with inaccurate range estimates for electric vehicles may present a significant burden on vehicle operators, and may limit the ability or willingness of vehicle operators to travel with substantial towed or carried loads.

Accordingly, long-felt needs exist for range estimation apparatus, systems, and methods, that address the forgoing and other concerns.

The information included in this Background section of the specification is included for technical reference purposes only and is not to be regarded as subject matter by which the scope of the disclosure is to be bound.

SUMMARY

Disclosed are apparatus, systems, and methods for estimating and reporting the range of electric vehicles with towed or carried loads, henceforth referred to collectively as an "EV towing range estimator."

In some implementations, the present disclosure is directed to a driving range estimator system for a vehicle accounting for a load on the vehicle. The system may include an energy storage device configured to power the vehicle, with the energy storage device including a store of energy. Sensors may be disposed about the vehicle and configured to detect information relevant to a range estimate. A towing control unit may be configured to receive the detected information from the sensors and may determine a) an expected range for the vehicle with the load, and b) an expected range for the vehicle without the load. The system may also include a display configured to simultaneously display a) the expected range for the vehicle with the load and b) the expected range for the vehicle without the load.

In some aspects, the towing control unit is configured to compare the expected range for the vehicle with the load and the expected range for the vehicle without the load to a distance to a desired destination, and is configured to output a recommendation that helps the vehicle reach the desired destination. In some aspects, the sensors are configured to detect a mass of the load and the towing control unit is configured to determine the expected range of the vehicle with the load based on the detected mass.

In additional implementations, the present disclosure is directed to a driving range estimator system that includes a vehicle comprising a power source, sensors, and one or more electric motors. A load may be attached to the vehicle, the load having a gross weight, a tongue weight, and a tongue drag. The system may include a mapping unit configured to compute a distance to a first destination along a route and a towing control unit configured to determine, based on at least one of the gross weight, the tongue weight, and the tongue drag: an expected range for the vehicle with the load; an expected range for the vehicle without the load; that the range of the vehicle with the load exceeds a distance to the first destination along the route; and a distance at which the load must be removed in order for the vehicle to reach the first destination. The system may also include a display configured to show an expected range for the vehicle with the load and an expected range for the vehicle without the load.

In some aspects, the first destination is an electric vehicle charging station. In some aspects, the first destination is a closest electric vehicle charging station along or near a desired route to a second destination. The mapping unit may be configured to automatically select the first destination. In some aspects, the first destination is selected by the mapping unit based on one or more of: charger availability, a minimum current distance from the vehicle, a minimum time to reach the electric vehicle charging station, a minimum energy to reach the electric vehicle charging station, a minimum cost for charging, and a minimum time for charging. In some aspects, the towing control unit is configured to determine a gross weight of the vehicle including the load based on data received from the sensors including at least one of a velocity, an acceleration, an accelerator pedal position, a power output, and a G-force. In some aspects, the towing control unit is configured to determine a gross weight of the load by taking into account at least one of: an expected vehicle weight without the load, a sensed tongue weight of the load, a sensed tongue drag of the load, elevation or grade information along the route, and an inclination of the vehicle. In some aspects, the towing control unit is configured to determine the expected range for the vehicle with the load by taking into account elevation and grade information along the route. In some aspects, the towing control unit is configured to alert a driver after determining that the range of the vehicle with the load exceeds a distance to the first destination along the route. In some aspects, the towing control unit is configured to alert the driver by at least one of: a text warning on the display, a symbol on the display, a flashing light or flashing group of pixels, a haptic feedback, an audible warning sound, and an audible warning message.

In additional implementations, the present disclosure is directed to methods of estimating a driving range for a vehicle accounting for a load on the vehicle. The methods may include gathering information from an energy storage device and sensors of a vehicle; receiving a destination and determining a distance of a route to the destination; determining a first amount of energy to be consumed while travelling to the destination with a load; determining a second amount of energy to be consumed while travelling to the destination without a load; comparing the first amount of energy to an energy level in the storage device to determine a first vehicle range with a load; comparing the second amount of energy to the energy level in the storage device to determine a second vehicle range without a load; and simultaneously displaying the first vehicle range and the second vehicle range on a display device.

In some aspects, the method may include determining that the distance along the route to the destination is greater than the first vehicle range with the load; and based on the first amount of energy and the second amount of energy, determining how far the vehicle can travel before decreasing the load to reserve sufficient energy to arrive at the destination. In some aspects, the method may include displaying an alert on the display indicating a distance until the load should be decreased to reserve sufficient energy to arrive at the destination. In some aspects, determining the first amount of energy to be consumed while travelling to the destination with the load includes taking into account at least one of: vehicle acceleration, battery voltage, battery current, and road grade. In some aspects, determining a first amount of energy to be consumed while travelling to the destination with a load includes taking into account at least one of: vehicle nominal mass, vehicle speed, aerodynamic drag, and system efficiency.

The EV towing range estimator disclosed herein has particular, but not exclusive, utility for consumer and commercial electric vehicles and plug-in hybrid vehicles.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
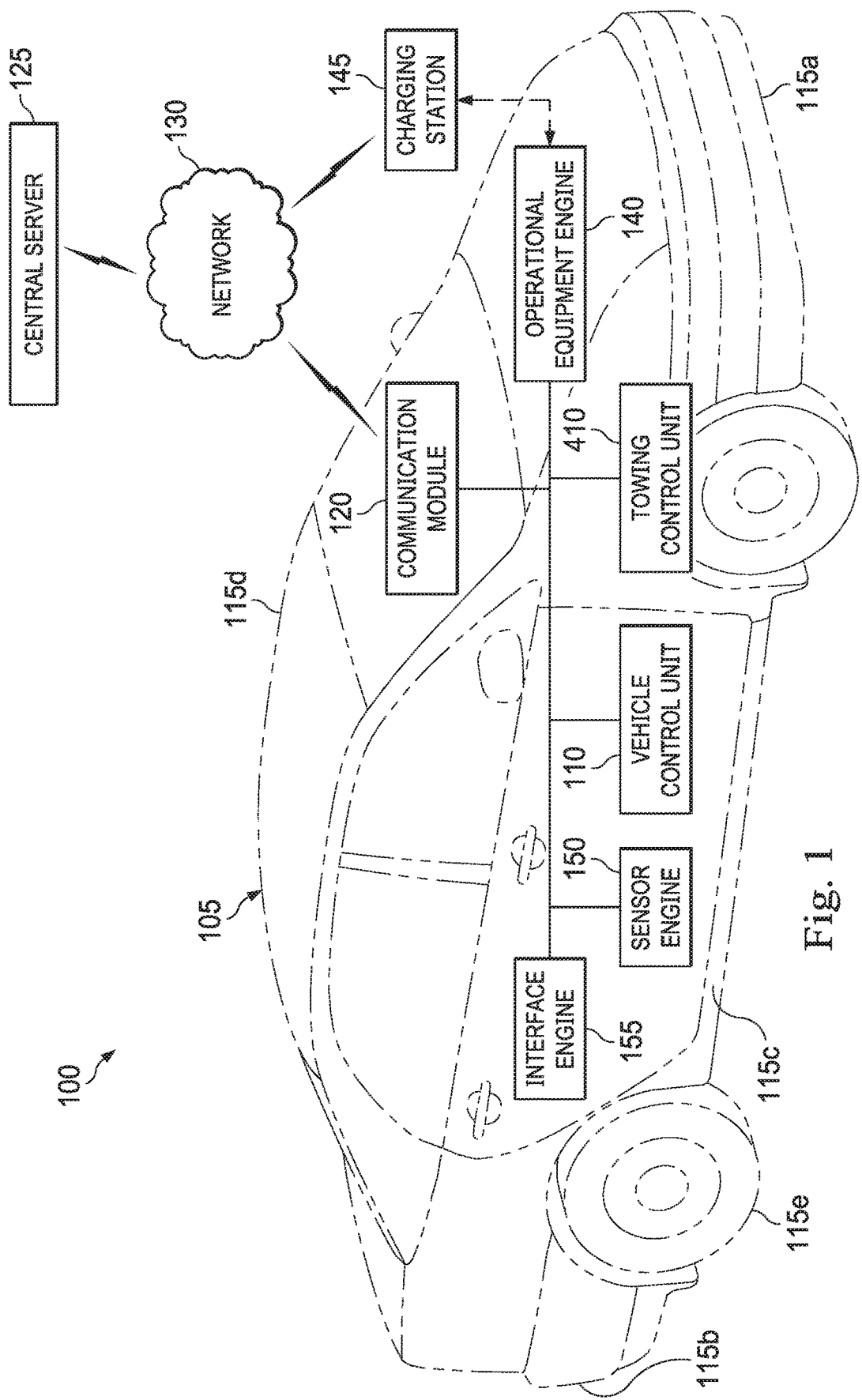
FIG. 1 is a diagrammatic illustration of a battery usage tracking system operable to track a vehicle's battery usage, according in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Disclosed are apparatus, systems, and methods for estimating and reporting the range of electric vehicles with towed or carried loads (also known as loads or masses), which will be referred to collectively as an "EV towing range estimator." In particular, in accordance with at least one embodiment of the present disclosure, the EV towing range estimator may simultaneously display range estimates for a given vehicle with and without its towed or carried load. Additionally, in accordance with at least one embodiment of the present disclosure, the EV towing range estimator may accept information from a mapping service, geographic information system (GIS) service, or other service about the location, range, route or path, and topography to a destination (e.g., an electric vehicle charging station) or set of destination coordinates, and then determine and report whether the vehicle is capable of reaching that destination with and without the towed or carried load. Further, in accordance with at least one embodiment of the present disclosure, the EV towing range estimator may provide an estimate of the distance or location at which the towed or carried load must be removed from the vehicle, in order for the vehicle to reach the destination. This may, for example, permit a vehicle operator to drive a certain distance with a trailer attached, then pull over and detach the trailer by the roadside, then travel to an electric vehicle charging station to acquire a full battery charge, then return to the trailer and reattach it, and finally resume the journey to an ultimate destination.

These descriptions are provided for exemplary purposes, and should not be considered to limit the scope of the EV towing range estimator. Certain features may be added, removed, or modified without departing from the spirit of the claimed subject matter.

FIG. 1 is a diagrammatic illustration of a battery usage tracking system operable to track a vehicle's battery usage, according in accordance with at least one embodiment of the present disclosure. In an example, a typical battery usage tracking system ask known in the art is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. The operational equipment engine 140 is connectable to a charging station 145, as will be described in further detail below. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the battery usage tracking system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, the central server 125, and the charging station 145.

The vehicle 105 also includes a towing control unit (TCU) 410, the operation and uses of which will be described below. A reader of ordinary skill in the art will understand that other components or arrangements of components may be found in an electric vehicle (EV).

Figure 2:
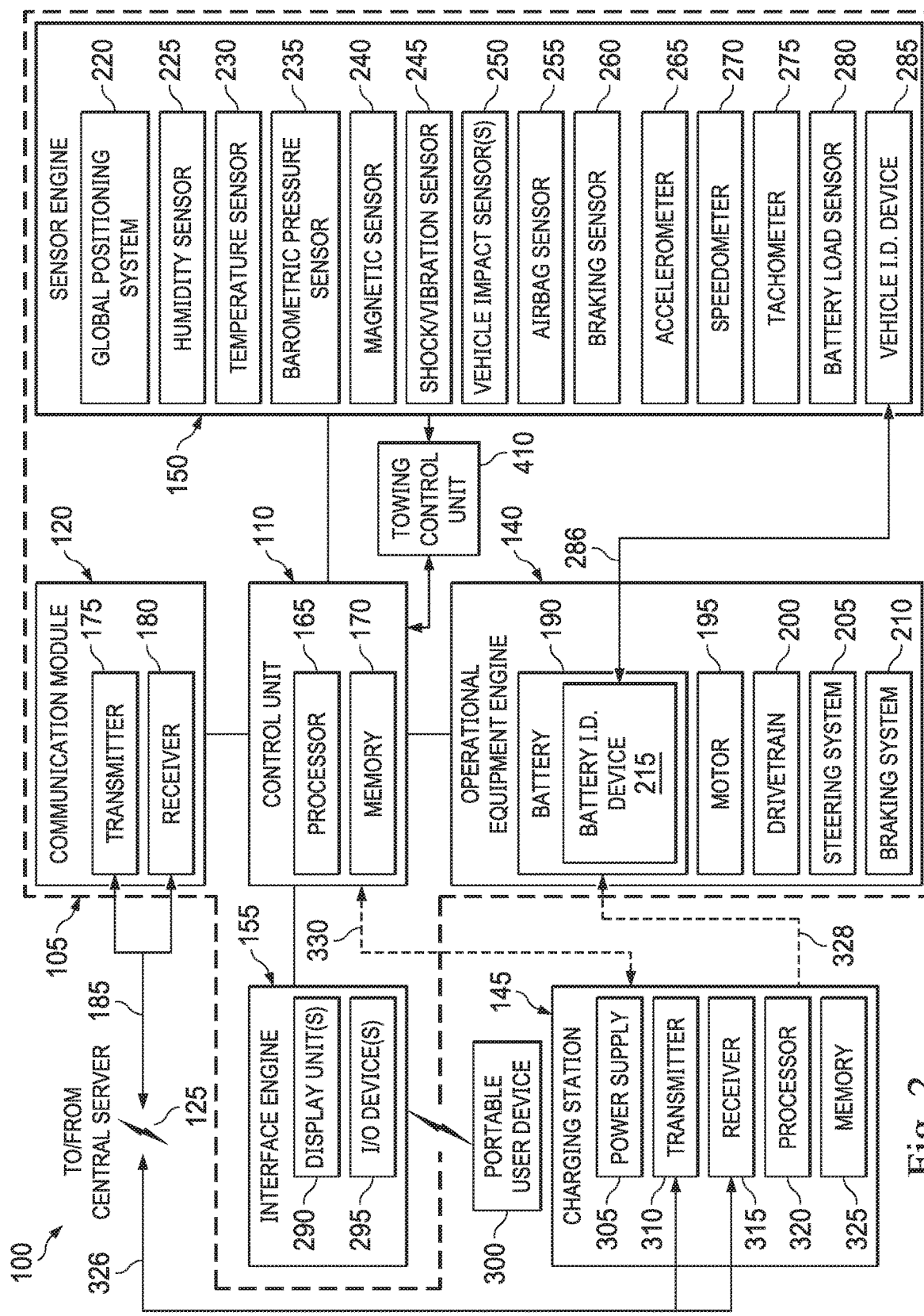
FIG. 2 is a diagrammatic illustration of an apparatus including several components of the system of FIG. 1, in accordance with at least one embodiment of the present disclosure.

FIG. 2 is a diagrammatic illustration in a block-diagram form of at least a portion of the battery usage tracking system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. The vehicle battery 190 provides electrical power to the motor 195 to drive the wheels 115e of the vehicle 105 via the drivetrain 200. In some examples, in addition to providing power to the motor 195 to drive the wheels 115e of the vehicle 105 via the drivetrain 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

In some examples, the charging station 145 includes a power supply 305, a transmitter 310, a receiver 315, a processor 320, and a memory 325. In some examples, one or the other of the transmitter 310 and the receiver 315 may be omitted according to the particular application for which the charging station 145 is to be used. In some examples, the transmitter 310 and the receiver 315 are combined into a transceiver capable of both sending and receiving wireless signals. The charging station 145 is adapted to recharge the vehicle battery 190, as indicated by arrow 328. In some examples, before, during, and/or after the recharging of the battery by the charging station 145, the charging station 145 is further adapted to send and/or receive data to and/or from the vehicle control unit 110, as indicated by arrow 330.

The vehicle 105 also includes a towing control unit (TCU) 410, the operation and uses of which will be described below. A reader of ordinary skill in the art will understand that other components or arrangements of components may be found in an EV.

Figure 3:
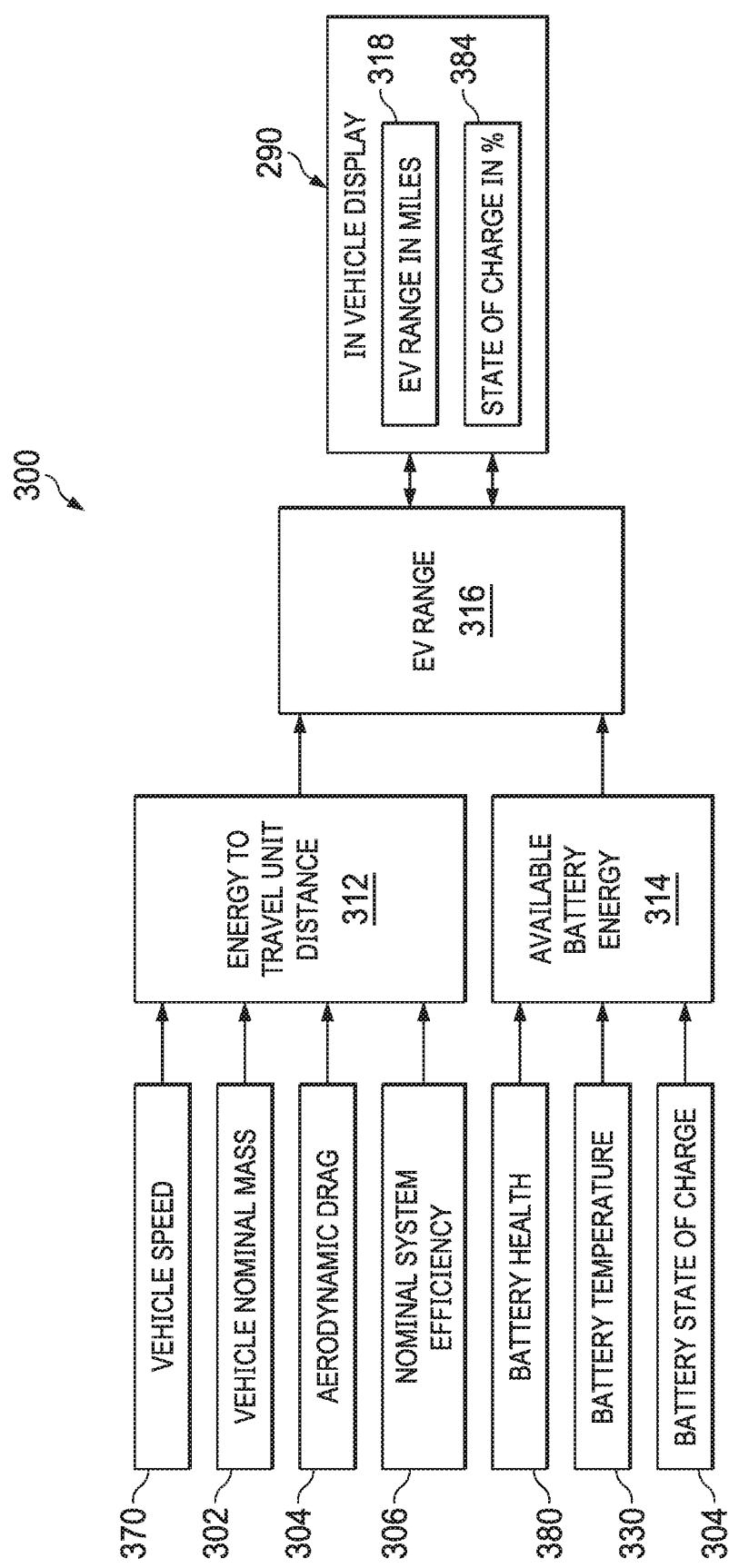
FIG. 3 is a diagrammatic illustration indicating some basic elements involved in displaying a calculated vehicle range.

FIG. 3 is a diagrammatic illustration indicating the basic elements involved in calculating and displaying a range for an electric vehicle using physics calculations. In an example, the procedure begins with the acquisition of variables including but not limited to a vehicle speed 370, vehicle nominal mass 302, vehicle aerodynamic drag 304, nominal system efficiency 306, battery health 380, battery temperature 330, and battery state of charge 382. In an example, the vehicle speed 370 is acquired from the speedometer 270. In an example, the vehicle nominal mass 302 (e.g., a stock or expected mass or weight) and nominal system efficiency 306 are acquired from read-only memory locations within the memory 170 of the Vehicle Control Unit (VCU) 110. In some implementations, the vehicle nominal mass 302 and nominal system efficiency 306 are acquired directly or indirectly from sensors, such as load sensors, strain measurements, accelerometers, and other sensors capable of detecting the vehicle nominal mass 302 or nominal system efficiency 306. In an example, the aerodynamic drag 304 and battery health 380 are acquired from computations performed by the VCU 110 based on detected information such as variables, or constants. In an example, the battery temperature 330 is acquired from the temperature sensor 230, and the battery state of charge is acquired from the battery sensor 280.

In an example, an Energy to Travel Unit Distance 312 and Available Battery Energy 314 are then computed, and an EV Range 316 (i.e., the estimated range the EV is expected to be able to travel, using the charge remaining in the battery) is computed based on these two values. In an example, these computations occur within the VCU 110, although other components may be used. Next, a display 290 shows an EV range display 318, which conveys the EV range 316 to an interested party, such as a vehicle operator. The EV range display 318 may be positioned for viewing by the vehicle operator. The EV range display 318 may express the remaining range, such as a real-time estimation of the remaining range, in miles, kilometers, or any other unit as either a design choice or an operator selection. In the example implementation described herein, the display 290 also shows a state of charge display 384, which conveys the available battery charge 314, and may be expressed as a numerical fraction or percentage, or may be expressed graphically as a bar graph or other graphical representation. In an example, the display 290 may be a single in-vehicle display (e.g., an LED or LCD screen). In other examples it may be several components of a dashboard or instrument panel.

A reader of ordinary skill in the art will understand that other variables or calculations may be included than those recited here, and that variables may be acquired from different or multiple sources, in order to produce and report an accurate and timely estimate of the expected range of an electric vehicle while the vehicle is in operation. In some cases, the accuracy of an estimate may be affected by the number and quality of variables that are used to calculate it, such that less accurate estimates may readily be obtained using a small number of variables, whereas highly refined estimates may require data from a larger number of sensors and/or the calculation of one or more additional variables from the available data. The diagram of FIG. 3 is shown for exemplary purposes, and does not limit the matter claimed by the present disclosure.

Figure 4:
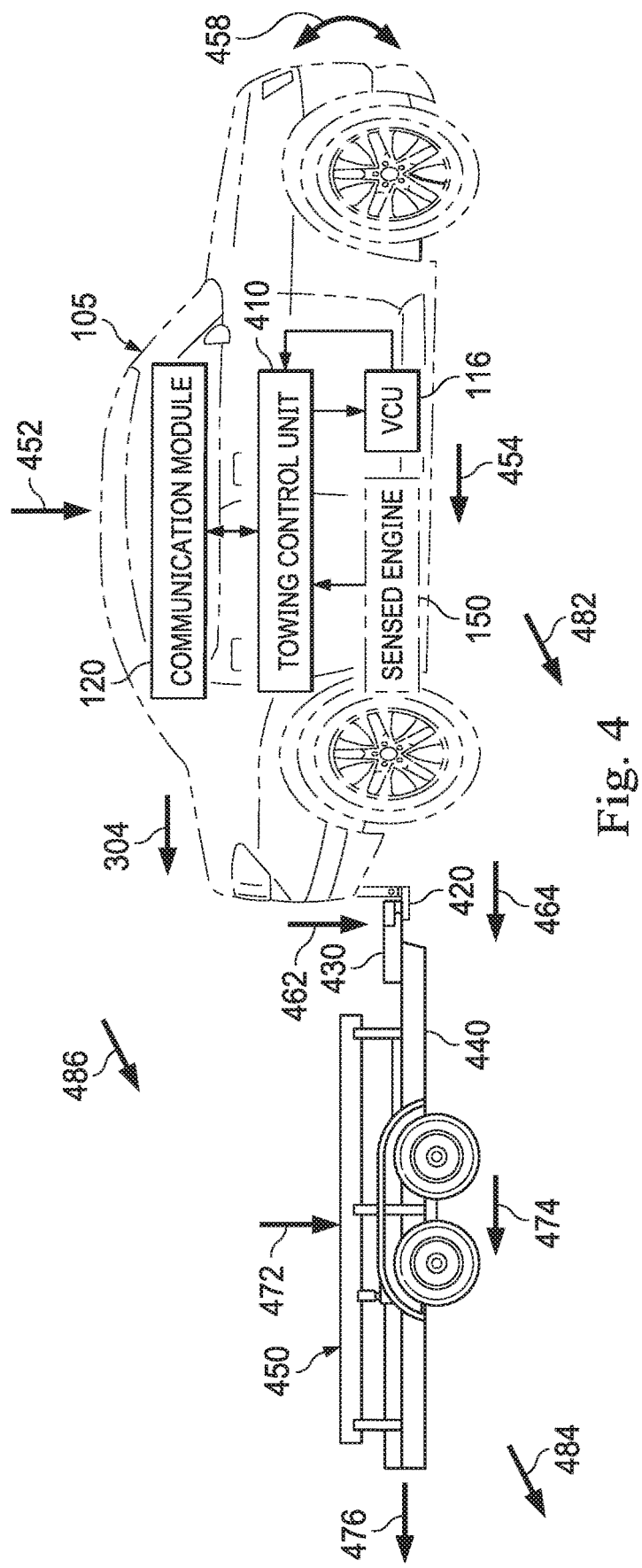
FIG. 4 is an exemplary diagrammatic illustration of an electric vehicle towing a trailer in accordance with at least one embodiment of the present disclosure.

FIG. 4 is an exemplary diagrammatic illustration of the battery usage tracking system 100 as an electric vehicle towing a trailer in accordance with at least one embodiment of the present disclosure. In this implementation, for clarity, only certain engines are shown. However, other engines or system, including those describe herein, are also contemplated as being a part of the electric vehicle towing a trailer shown in FIG. 4. In the example shown, within the vehicle 105 the VCU 110, sensor engine 150, and communications module 120 are in communication with a Towing Control Unit (TCU) 410 that is capable of performing additional calculations specific to estimating the range of an EV with a towed or carried load. The vehicle 105 includes a trailer hitch 420 that connects to a removable coupler 430 which is fixedly attached to the tongue 440 of a trailer 450.

Force variables that may be incorporated into physics calculations within the TCU 410 include but are not limited to the vehicle absolute weight 452, vehicle rolling friction 454, vehicle aerodynamic drag 304, vehicle pitch 458, trailer tongue weight 462, trailer tongue drag 464, trailer absolute weight 472, trailer rolling friction 474, and trailer aerodynamic drag 476. In some examples, each of these variables is a force that may be expressed in lbf, Newtons, or any other unit of force as desired. In an example, the vehicle pitch 458 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent to the road surface. The difference between these two acceleration vectors indicates vehicle pitch 458. If force sensors exist in the trailer hitch 420, it may be possible to obtain a direct measurement of the tongue weight 462 and tongue drag 464, where tongue drag is approximately equal to the trailer rolling resistance 484.

Others of the force variables may not be directly known, but may be estimated from graphs, curves, or lookup tables for a nominal vehicle (e.g., vehicle weight 452, vehicle rolling friction 454, and vehicle aerodynamic drag 304). Other variables may be calculated or estimated from performance variables that normally exist within the VCU 110. For example, the combined mass, gross weight, or inertia of the vehicle 105 and trailer 450 may be determined from the acceleration profile of the vehicle given a known force imparted by the motor 195 and drivetrain 200, and the Newtonian relationship F=ma. The mass of the trailer may then be estimated by subtracting a nominal or expected vehicle mass (e.g., stock weight or stock mass), and the weight 472 of the trailer is the gravitational force or g-force exerted by the Earth on such a mass. Alternatively, if the road grade is known (e.g., from GPS data), the combined vehicle and trailer mass may be estimated based on the work or energy required for the operational equipment engine to push the vehicle uphill, or the force required hold it from rolling backward. In an example, these and related methods are used to determine whether a substantial towed or carried load is present, and if so, to activate other features of the present disclosure as described below.

The total drag on the vehicle can be calculated based on the power output required to maintain a particular vehicle speed 370, and the sum of trailer aerodynamic drag 476 and rolling friction 474 may be computed based by subtracting nominal or estimated values of the vehicle rolling friction 454 and aerodynamic drag 304. The ratio of aerodynamic drag to rolling friction can be estimated from known relationships for typical trailers, or by other methods. The grade of the road or ground surface under the vehicle may be calculated from accelerometers. Vehicle pitch 458 and vehicle weight 452 can be used to calculate the tongue weight 462 of the trailer 450 by treating the vehicle 105 as a lever, and the tongue weight 462 serves as a lower limit for the absolute weight 472 of the trailer 450. It should be noted that for a properly balanced trailer, the tongue weight 462 may be substantially smaller than the trailer weight 472.

If the road grade is known, which may be calculated or taken directly from stored maps, GPS data or other indicators, the combination of vehicle weight 452, vehicle aerodynamic drag 304, and vehicle rolling friction 454 can be used to compute a vehicle rolling resistance vector 482 (e.g., as a vector sum of the force vectors). Alternatively, if the vehicle rolling resistance 482 can be computed based on performance data stored within the VCU 110, the forces that contribute to the rolling resistance 482 may be computed or estimated. The total rolling resistance 486 of the vehicle with trailer is the vector sum of the vehicle rolling resistance 482 and trailer rolling resistance 484. Alternatively, the vehicle rolling resistance 482 with the trailer removed is equal to the total rolling resistance 486 minus the trailer rolling resistance 484. Accelerator pedal position may also be incorporated as being proportional to an expected power output for the motor 195.

Expected range 316 for an electric vehicle 105 is proportional to the rolling resistance the vehicle 105 experiences while in motion, so a range estimate 316 computed from the total rolling resistance 486 (or from the separate variables that contribute thereto) will indicate the range of the vehicle 105 with the trailer 450 attached, whereas a range estimate 316 computed from the vehicle rolling resistance 482 (or from the separate variables that contribute thereto) will indicate the range of the vehicle 105 with the trailer 450 detached.

Histories, time averages, first derivatives, integrals, or filters of any of the aforementioned variables, along with known, anticipated, or estimated future values for some or all of the variables may also be incorporated into the physics calculations to improve or refine the results of the calculations.

Figure 5:
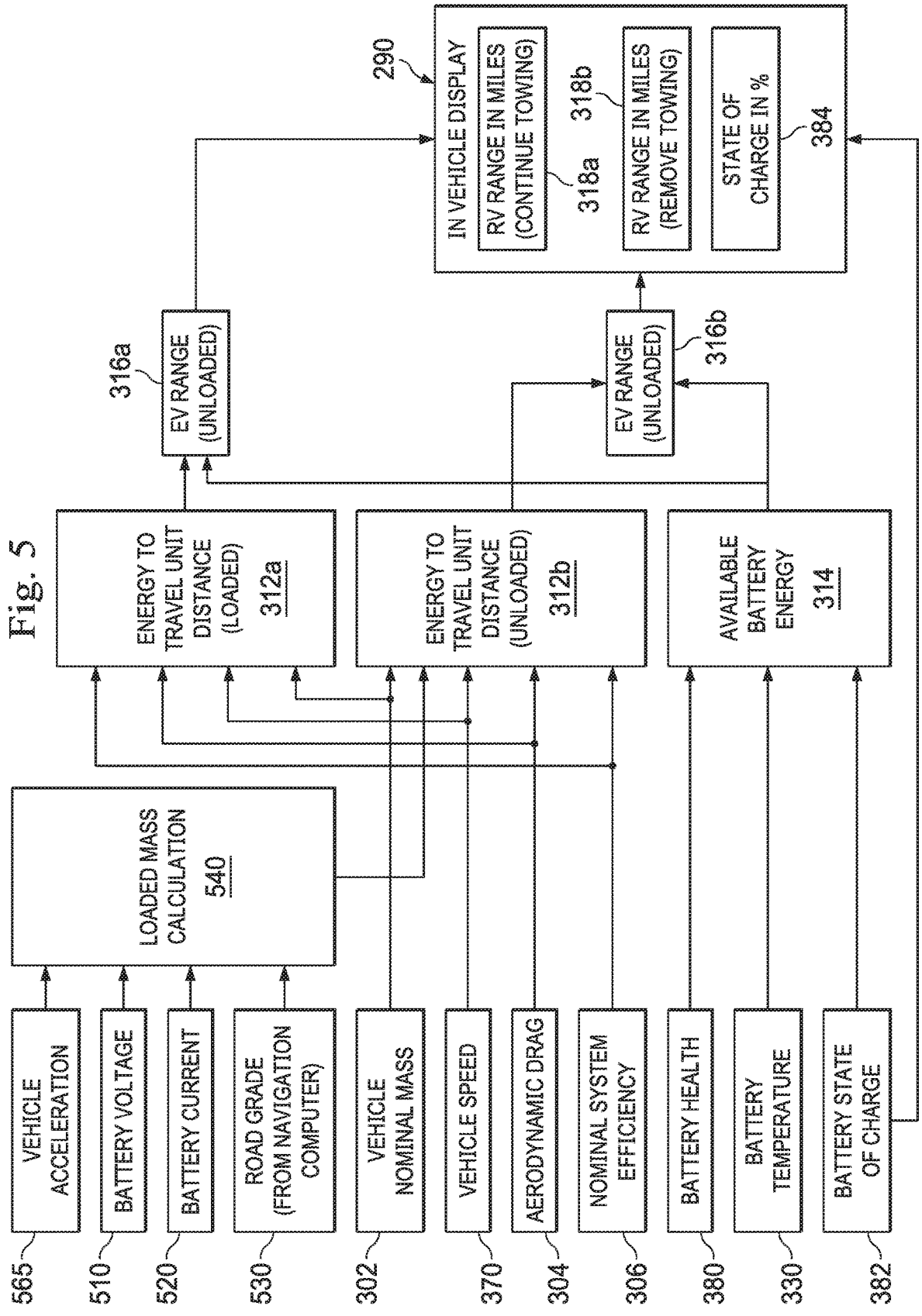
FIG. 5 is a diagrammatic illustration indicating some basic elements involved in displaying a calculated vehicle range in accordance with at least one embodiment of the present disclosure.

FIG. 5 is a diagrammatic illustration indicating the basic elements involved in displaying a calculated vehicle range taking into account load variables such as those discussed herein in accordance with at least one embodiment of the present disclosure. In an example, as with FIG. 3, the procedure begins with the acquisition of variables including but not limited to a vehicle speed 370, vehicle nominal mass 302, vehicle aerodynamic drag 304, nominal system efficiency 306, battery health 380, battery temperature 330, and battery state of charge 382. In an example, the vehicle speed 370 is acquired from the speedometer 270. In an example, the vehicle nominal mass 302 and nominal system efficiency are acquired from read-only memory locations within the memory 170 of the Vehicle Control Unit (VCU) 110. In an example, the aerodynamic drag 304 and battery health 380 are acquired from computations performed by the VCU 110. In an example, the battery temperature 330 is acquired from the temperature sensor 230, and the battery state of charge is acquired from the battery sensor 280.

According to at least one embodiment of the present disclosure, a number of additional variables are acquired beyond those seen in FIG. 3. These include but are not limited to vehicle acceleration 565, battery voltage 510, battery current 520, and road grade 530. In an example, the vehicle acceleration 565 is acquired from either or both of the speedometer 270 and the accelerometer 265, the battery voltage 510 and battery current 520 are acquired from the battery sensor 280, and the road grade 530 is acquired from any or all of the global positioning system (GPS) 220, the communication module 120, or the VCU 110. Either or both of the GPS 220 and communication module 120 may receive road grade information from mapping or GIS services on a remote server 125, such information including but not limited to Google Maps, Google Earth, MapQuest, HERE, Bing Maps, OpenStreetMap, and Apple Maps, or their equivalents. The VCU 110 may estimate the road grade 530 based on data from the accelerometer 265 and speedometer 270. Alternatively, either or both of the GPS 220 and VCU 110 may incorporate stored road grade and elevation data. In this context, singly or collectively, the GPS 220, VCU 110, and remote server 125 may be referred to as a mapping unit (MU).

According to at least one embodiment of the present disclosure, the vehicle acceleration 565, battery voltage 510, battery current 520, and road grade information 530 are used to perform a loaded mass calculation 540. In an example, the loaded mass calculation 540 is a physics calculation that occurs within the towing control unit (TCU) 410, and proceeds according to known principles as described hereinabove. The loaded mass calculation 540 may compute any combination of the total rolling resistance 486, the trailer rolling resistance 484, the vehicle rolling resistance 482, vehicle weight 452, trailer weight 472, vehicle aerodynamic drag 304, trailer aerodynamic drag 476, vehicle rolling friction 454, and trailer rolling friction 474 such that the TCU 410 may then, according to known principles, compute the energy 312 required to travel a unit distance in both the loaded state (312a—the energy required with the towed or carried load) and the unloaded state (312b—the energy required without the towed or carried load).

In an example, the available battery energy 314 is then computed, and used along with the energy per unit distance 312a and 312b to compute the EV Range (loaded) 316a and the EV Range (unloaded) 316b (i.e., the estimated range the EV is expected to be able to travel, using the charge remaining in the battery, respectively with and without the towed or carried load). In an example, these computations occur within the TCU 110, although other components may be used. Next, a display 290 shows the vehicle state of charge 384, as well as EV range display 318a with the towed or carried load and 318b without the towed or carried load. In some implementations, the range displays 318a and 318b may be expressed in miles, kilometers, or any other unit based on an operator selection. The available battery charge 314 may be expressed as a numerical fraction or percentage, or may be expressed graphically as a bar graph or other graphical representation. In accordance with at least one embodiment of the present disclosure, the display 290 may be a single in-vehicle display (e.g., an LED or LCD screen), or may be several components of a dashboard or instrument panel.

In some implementations, other variables or calculations may be included in place of or in addition to those recited here, and that those other variables may be acquired from different or multiple sources, in order to produce and report a relatively accurate and timely estimate (including in real-time) of the expected range of an electric vehicle—both with and without the towed or carried load—while the vehicle is in operation. In some cases, the accuracy of an estimate may be affected by the number and quality of variables that are used to calculate it, such that less accurate estimates may readily be obtained using a small number of variables, whereas highly refined estimates may require data from a larger number of sensors and/or the calculation of one or more additional or intermediate variables from the available data. Such variations do not depart from the spirit of the present disclosure and fall within the scope of the claimed matter.

Figure 6:
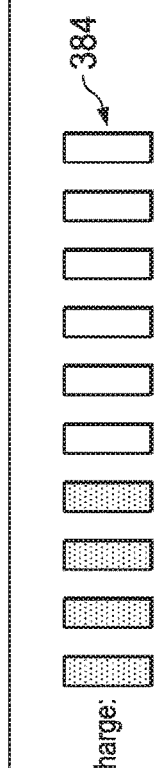
FIG. 6 is an example range estimator display in accordance with at least one embodiment of the present disclosure.

FIG. 6 is an example range estimator display in accordance with at least one embodiment of the present disclosure. Visible are the charge indicator 304, loaded range indicator 318a, and unloaded range indicator 318b, which have been calculated as described hereinabove. In this example, the state of charge display 384 is depicted visually as a filled bar graph, although other types of graphs, gauges, numerical, or alphanumerical displays may be used to convey the same information. In this example, the loaded range indicator 318a is expressed alphanumerically in kilometers, and may inform a vehicle operator of the total distance the EV may be able to travel on its current battery charge with the towed or carried load included. The unloaded range indicator 318b is also expressed alphanumerically in kilometers, although both the loaded and unloaded ranges may be expressed in other units and in other manners, whether numerical, alphanumeric, or graphical.

This information may be used by a vehicle operator to make logistical choices about the routing and operation of the vehicle. In an example, a vehicle operator may opt to abort a planned route and proceed to an EV charging station 145 with the trailer 450 still attached to the vehicle 105. In another example, the vehicle operator may determine that sufficient charge does not exist to bring the vehicle to an available charging station with the trailer still attached. In this case, the vehicle operator may elect to pull the vehicle 105 over to the side of the road, detach the trailer 450, proceed to a selected EV charging station 145 to acquire a full battery charge, then return for the trailer and proceed toward the original destination. In a third example, the vehicle operator may determine that the intended destination is within the range of the vehicle with the trailer attached, and may opt to make no changes in the intended route or timeline. It is noted that in all three cases, the determination is made by the vehicle operator, based on mental calculations using the information provided in the display 290.

Depending on the implementation, the display 290 may be a single display screen (e.g., an LED or LCD screen), or may be distributed across multiple display screens, either as part of a single instrument panel or dashboard or otherwise. As a further implementation, the display may be a touchscreen or may include controls 295. The controls may be input devices, such as buttons, wheels, switches or other hardware, or software generated selectable icons, images, or other selectable features.

Figure 7:
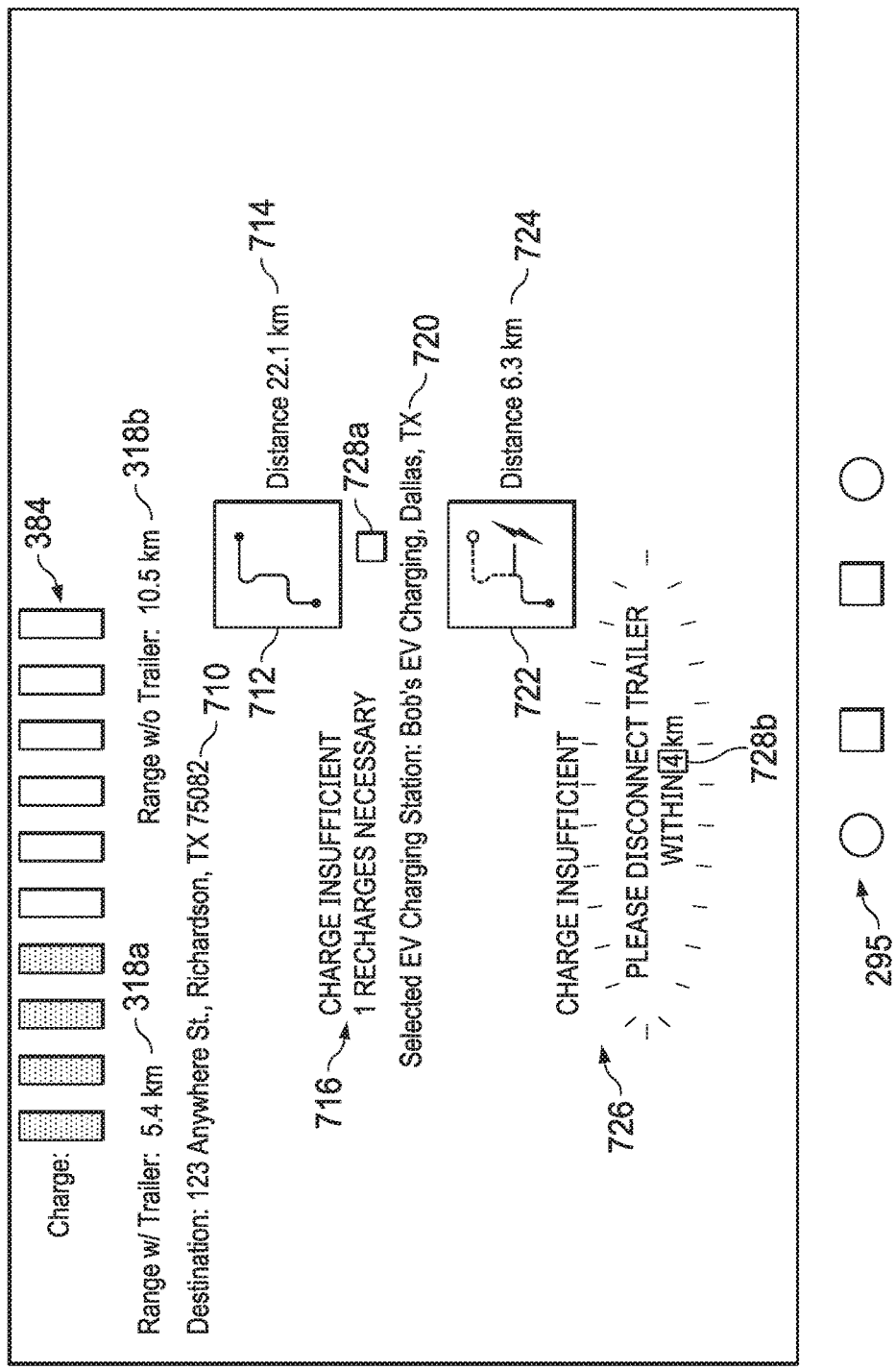
FIG. 7 is an example range estimator display in accordance with at least one embodiment of the present disclosure.

FIG. 7 is an example range estimator display in accordance with at least one embodiment of the present disclosure. This exemplary display provides significantly more information to a vehicle operator, and relieves the operator of the need to perform certain mental calculations in order to determine an appropriate course of action.

Depending on the implementation, the display 290 may be a single display screen (e.g., an LED or LCD screen), or may be distributed across multiple display screens, either as part of a single instrument panel or dashboard or otherwise. In a further implementation, the display may be a touchscreen or may include controls 295. As with FIG. 6, the display 290 shows a charge indicator 384, a loaded range indicator 318a, and an unloaded range indicator 318b. However, in this example the display 290 also shows additional information, including a destination 710, destination routing map 712, destination range or distance 714, destination recommendation 716, selected EV charging station 720, station routing map 722, station range or distance 724, and station recommendation 726.

In an example, the destination 710 is set by the vehicle operator, and may indicate a home, business, camp site, or other desired location. In the example the destination routing map 712 may be determined by either or both of the GPS 220 and the communication module 120 in communication with mapping or GIS information available at a remote server 125 (any or all of which may be referred to as a mapping unit or MU in this context), although routing maps may be stored, retrieved, obtained, or constructed by other means, including pre-stored mapping systems, destinations entered into the portable user device, or otherwise. The destination routing map may indicate the present location of the vehicle, the location of the destination, and a preferred or selected route or path for reaching the destination 710. The destination range or distance 714 is the amount of distance the vehicle must traverse to reach the destination, and may be calculated along with the destination routing map or otherwise.

The destination recommendation 716 provides clear instructions to the vehicle operator as to whether the destination can be reached on the available battery charge. In the example shown, the recommendation states: "Range Insufficient: 1 recharges necessary." This message, or its equivalent, informs the vehicle operator that one battery recharge will likely be sufficient to reach the destination, with the vehicle 105 and trailer 450 in their current configuration (e.g., trailer attached). Other example recommendations 716 include "CHARGE SUFFICIENT TO REACH DESTINATION", or "CHARGE SUFFICIENT IF TRAILER IS DISCONNECTED WITHIN XXX", where "XXX" is a distance (e.g., in miles or kilometers) within which the towed or carried load must be removed in order for the vehicle 105 to reach the destination 710 before depleting its available battery energy 314. This distance shall be referred to as the destination disconnect distance 728a. Yet other recommendations 716 are contemplated.

For purposes of the example recommendation 716, the charge is considered sufficient if the estimated range of the vehicle exceeds the calculated distance to the destination. This calculation may take into account (either explicitly or implicitly) multiple factors such as road grade, wind, tire inflation, and vehicle performance. The destination disconnect distance 728a is the distance at which the loaded range 318a will fall below the destination distance 714, but the unloaded range 318b will remain above the destination distance 714. In the example shown in the figure, the destination disconnect distance 728a is blank, as there is no need or recommendation to remove the towed or carried load.

The destination recommendation 716 will generally advise the vehicle operator either to (a) proceed toward the destination 710 without stopping, (b) charge the vehicle an estimated or expected number of times before reaching the destination, or (c) remove the towed or carried load within a specified distance—the destination disconnect distance 728b, in order to reach the destination without charging. This recommendation may not fully take the place of a vehicle operator's judgment, but may significantly relieve a burden of mental calculation.

For EVs, as for internal combustion vehicles, a need to refuel or recharge in the middle of a journey is a common and unsurprising occurrence. However, vehicle operators are not always aware of the locations or availability of nearby charging stations. In an example, an EV charging station 720 may be selected manually by the vehicle operator, or may be selected automatically by the GPS 220, remote server 125, communication module 120, or otherwise based on any or all of charger availability, minimum current distance from the vehicle 105, minimum distance from the desired route 712, minimum time to reach, minimum energy to reach, minimum cost, maximum charging speed, or other related factors.

In this example, a station routing map 722 is provided according to the same principles as the destination routing map 712. The station routing map indicates a desired, selected, recommended, or desirable route between the present location of the vehicle 105 and the charging station 145. In some implementations, the destination route 712 may also be indicated (e.g., as a dotted line). The station distance 724 is the distance that must be traversed by the vehicle 105 to reach the station 145.

The station recommendation 726 provides the same types of information described above for the destination recommendation 716, and will generally advise the vehicle operator to (a) skip the charging station 145 and proceed toward the destination 710, (b) proceed to the charging station 145 without removing the towed or carried load, (c) remove the towed or carried load within a specified distance—the station disconnect distance 728*b*—and then proceed to the charging station 145, or (d) remove the towed or carried load immediately and proceed to the charging station 145. This recommendation may not fully take the place of a vehicle operator's judgment, but may significantly relieve a burden of mental calculation. In the case of the charging recommendation this relief may be particularly acute, as the relative scarcity and long charging times of EV charging stations, coupled with the much greater inconvenience of running an EV out of charge vs. running a combustion vehicle out of fuel, lead to the well-known phenomenon of "range anxiety." The added complexity of a towed or carried load may significantly compound this anxiety.

Accordingly, it can be seen that the station recommendation 726 in particular, and the EV towing range estimator in general, fill a long-standing need in the art, by providing critical information to the operators of EVs with significant towed or carried loads, about whether and when to remove the towed or carried loads in order to reach a destination, or a charging station en route to a destination.

Figure 8:
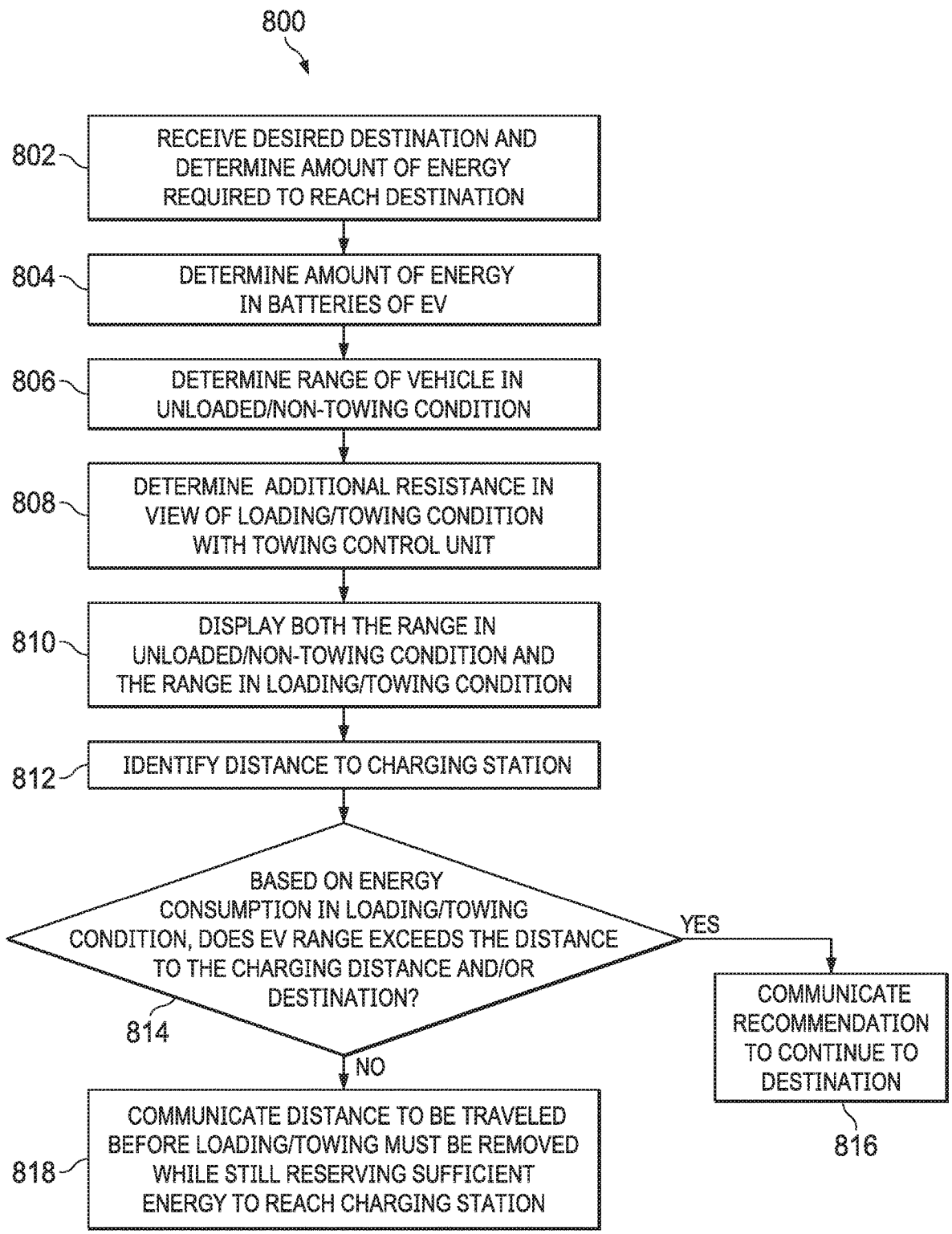
FIG. 8 shows an example method of using the battery tracking usage system with the towing control unit in accordance with the least one implementation of the present disclosure.

Referring to FIG. 8, a method 800 of using the battery tracking usage system 100 with the towing control unit 410 will be described. Although the steps or functions of the method will be described in a particular order, it should be understood that the steps or functions may be arranged in any order, unless explicitly claimed otherwise or a specific order is inherently necessitated by the claim language or by the nature of the step or function. In some implementations, the method 800 may be substantially carried out under the direction of the VCU 110, while in other implementations, the method may be substantially carried out under the direction of processors and memories from any of the engines described herein.

At 802, the VCU 110 may receive a desired destination and determine an amount of energy required to reach the destination. As described herein, receiving a desired destination may be an input at the interface engine 155 from a user, such as a driver, or may be an input through the portable user device 300, which may directly or indirectly communicate with the VCU 110.

At 804, the VCU 110 may determine the amount of energy in the operational equipment engine 140. The amount of energy may be an estimate based on the level of charge of the batteries.

At 806, the VCU may determine an estimated travel range of the vehicle in an unloaded/non-towing condition. This range may, in some implementations, be displayed in a manner shown in FIG. 6. Determining the estimated travel range may be accomplished using the principles described herein, and may take into account a number of constants and variables in the manner described herein. In some implementations, this may include determining the level of charge in the battery 190, and estimating the range using the principles described in FIGS. 3 and 5.

At 808, the VCU may determine additional resistance in view of the loading/towing condition with the towing control unit. Although the towing control unit is described independently of the VCU, in some implementations, the towing control unit may be a software module or option stored within the memory of the VCU. The VCU may take into account all the factors and variables described with reference to FIG. 5 to indicate the additional resistance in view of the loading/towing condition. In some implementations, a vehicle operator may activate the towing control unit 410 using an input device associated with the interface engine 155. In other implementations, the VCU may activate the towing control unit whenever towing is detected or whenever heavier than normal loads are detected.

At 810, the VCU may display information as set forth in the example in FIG. 7. This may include displaying the charge 384, the calculated range in an unloaded or non-towing condition as in 318*a*, and the calculated range in a loaded or towing condition as in 318*b*.

At 812, the VCU may identify a distance to the nearest charging station. In some implementations, this may include referencing charging station information obtained via the sensor engine, such as through the global positioning system 220, may include prestored charging station information, or may obtain the information via the portable user device. Other sources for the charging station information are also contemplated.

At 814, the VCU may determine based on energy consumption in a loaded condition whether the vehicle range exceeds the distance to the charging distance and/or the destination. It may do this by comparing the distance to the charging station to the range in the loading/towing condition of the vehicle. If at 816, the towing control unit determines that the range exceeds the distance to the charging distance and/or the destination, the ECU may communicate a recommendation for display to the vehicle operator to continue to the destination.

Alternatively, at 818, if the vehicle range does not exceed the distance to the charging distance and/or the destination, the VCU may display the distance to be travelled before unloading must occur while still reserving sufficient energy to reach the charging station or the destination. For example, if the desired destination is 100 miles away, and the vehicle range is 120 miles in an unloaded condition, but is 60 miles in a loaded condition, then the VCU may determine an average distance which the load can be driven before being dropped off in order to permit the vehicle to arrive at the desired destination. Once at the desired destination, the vehicle may be recharged and may return to obtain the load that may have been left along the traveled path.

A number of variations are possible on the examples and embodiments described above. For example, the display 290 could be replaced or supplemented with audible warnings, messages, flashing lights or indicators, data, and recommendations, or with haptic feedback (e.g., steering wheel vibration). The technology described herein may be implemented on manually controlled EVs, driver-assist EVs, or fully autonomous EVs. The technology described herein may be implemented in diverse combinations of hardware, software, and firmware, depending on the implementation or as necessitated by the structures and modules already present in existing EVs.

Accordingly, the logical operations making up the embodiments of the technology described herein may be referred to variously as operations, steps, objects, elements, components, or modules. Furthermore, it should be understood that components or steps may be arranged in any order, unless explicitly claimed otherwise or a specific order is inherently necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the EV towing range estimator. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the EV towing range estimator as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensor such as passenger weight sensors and cargo compartment weight sensors may be employed if available. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure. The principles described above can be equally applied to internal combustion vehicles by a person of ordinary skill in the art, wherein the energy storage device is a fuel tank rather than an electric battery, the recharging station is a fuel station rather than an electric vehicle charging station, and the remaining range until stored energy depletion is the range until fuel depletion rather than battery depletion.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A driving range estimator system for a vehicle accounting for a towing load on the vehicle caused by a trailer towed by the vehicle, the system comprising:
   an energy storage device configured to power the vehicle, the energy storage device comprising a store of energy;
   sensors disposed on-board the vehicle configured to detect information relevant to a range estimate;
   a towing control unit comprising a processor and a memory, and configured to receive in real time the detected information from the sensors, and configured to determine in real time a) an expected range for the vehicle with the towing load, b) an expected range for the vehicle without the towing load, and c) a distance at which the trailer must be detached from the vehicle in order for the vehicle to reach a specified destination; and
   a display configured to simultaneously display on a same screen a) the expected range for the vehicle with the towing load, b) the expected range for the vehicle without the towing load, and c) the distance at which the trailer must be detached from the vehicle in order for the vehicle to reach the specified destination.

2. The system of claim 1, wherein the towing control unit is configured to compare the expected range for the vehicle with the towing load and the expected range for the vehicle without the towing load to a distance to the specified desired destination, and is configured to output a recommendation that helps the vehicle reach the specified destination.

3. The system of claim 1, wherein the sensors are configured to detect a mass of the towing load and the towing control unit is configured to determine the expected range of the vehicle with the towing load based on the detected mass.

4. The system of claim 3, wherein the sensors are configured to detect a velocity, an acceleration, and a measurement of the store of energy within the energy storage device.

5. The system of claim 4, wherein the sensors are configured to detect one or more of a rate of depletion for the store of energy, a road grade, a vehicle pitch, an accelerator pedal position, a G-force, a power output, a tongue weight of the towing load, and a tongue drag of the towing load.

6. The system of claim 1, wherein the towing control unit is configured to determine the expected range for the vehicle with the towing load and without the towing load based on one or more of histories, time averages, integrals, first derivatives, or filters of some or all of the detected information from the sensors.

7. A driving range estimator system for a vehicle accounting for a load on the vehicle, comprising:
   the vehicle, wherein the vehicle comprises a power source, sensors, and one or more electric motors;
   a towing load attached to the vehicle, the towing load having a gross weight, a tongue weight, and a tongue drag;
   a mapping unit comprising a first processor and memory and configured to compute a distance to a first destination along a route;
   a towing control unit comprising a second processor and memory and configured to determine, based on at least one of the gross weight, the tongue weight, and the tongue drag:
      an expected range for the vehicle with the towing load;
      an expected range for the vehicle without the towing load;
      whether the expected range of the vehicle with the towing load exceeds the distance to the first destination along the route; and
      a distance at which the towing load must be removed in order for the vehicle to reach the first destination; and
   a display configured to show, simultaneously on a same screen, the expected range for the vehicle with the towing load, the expected range for the vehicle without the towing load, and the distance at which the towing load must be removed in order for the vehicle to reach the first destination.

8. The system of claim 7, wherein the first destination is an electric vehicle charging station.

9. The system of claim 8, wherein the first destination is selected by the mapping unit based on one or more of: charger availability, a minimum current distance from the vehicle, a minimum time to reach the electric vehicle charging station, a minimum energy to reach the electric vehicle charging station, a minimum cost for charging, and a minimum time for charging.

10. The system of claim 7, wherein the first destination is an electric vehicle charging station closest to the route, the mapping unit being configured to automatically select the first destination.

11. The system of claim 7 wherein the towing control unit is configured to determine a gross weight of the vehicle including the towing load based on data received from the sensors including at least one of a velocity, an acceleration, an accelerator pedal position, a power output, and a Gforce.

12. The system of claim 7, wherein the towing control unit is configured to determine a gross weight of the towing load by taking into account at least one of: an expected vehicle weight without the towing load, a tongue weight of the towing load sensed by a first tongue force sensor, a tongue drag of the towing load sensed by a second tongue force sensor, elevation or grade information along the route, and an inclination of the vehicle.

13. The system of claim 7, wherein the towing control unit is configured to determine the expected range for the vehicle with the towing load by taking into account elevation and grade information along the route.

14. The system of claim 7, wherein the towing control unit is configured to alert a driver after determining that the range of the vehicle with the towing load exceeds the distance to the first destination along the route.

15. The system of claim 14, wherein the towing control unit is configured to alert the driver by at least one of: a text warning on the display, a symbol on the display, a flashing light or flashing group of pixels, a haptic feedback, an audible warning sound, and an audible warning message.

16. A method of estimating a driving range for a vehicle accounting for a towing load on the vehicle, comprising, in real time:
gathering information from an energy storage device and sensors of a vehicle;
receiving a destination and determining a distance of a route to the destination;
determining a first amount of energy to be consumed while travelling to the destination with a towing load;
determining a second amount of energy to be consumed while travelling to the destination without the towing load,
comparing the first amount of energy to an energy level in the energy storage device to determine a first vehicle range with the towing load;
comparing the second amount of energy to the energy level in the energy storage device to determine a second vehicle range without the towing load;
comparing the first amount of energy to the second amount of energy to determine a distance along the route at which the towing load must be detached from the vehicle in order for the vehicle to reach the destination, and
simultaneously displaying on a same screen of a display device the first vehicle range, the second vehicle range, and the distance along the route at which the towing load must be detached from the vehicle in order for the vehicle to reach the destination.

17. The method of claim 16, comprising:
determining that the distance along the route to the destination is greater than the first vehicle range with the towing load before determining the distance along the route at which the towing load must be detached from the vehicle in order for the vehicle to reach the destination.

18. The method of claim 16, comprising displaying an alert on the display indicating a distance until the towing load should be decreased to reserve sufficient energy to arrive at the destination.

19. The method of claim 16, wherein determining the first amount of energy to be consumed while travelling to the destination with the towing load includes taking into account at least one of: vehicle acceleration, battery voltage, battery current, and road grade.

20. The method of claim 19, wherein determining the first amount of energy to be consumed while travelling to the destination with a towing load includes taking into account at least one of: vehicle nominal mass, vehicle speed, aerodynamic drag, and system efficiency.

* * * * *